United States Patent Office
3,331,888
Patented July 18, 1967

3,331,888
POLYOLEFINS CONTAINING POLYAMIDES OBTAINED BY THE REACTION OF N,N'-BIS (OMEGA - CARBOALKOXYALKYL) PIPERAZINE WITH DIAMINES
Giuseppe Cantatore, Terni, Italy, assignor to Montecatini Edison S.p.A., Milan, Italy, a corporation of Italy
No Drawing. Filed Sept. 15, 1964, Ser. No. 396,755
Claims priority, application Italy, Sept. 18, 1963, 19,060/63
19 Claims. (Cl. 260—857)

This invention is directed to the preparation of manufactured shaped articles including textile fibers, films, tapes, and the like. More specifically, this invention is directed to the manufacture of various shaped articles comprising polymers of higher alpha-olefins consisting prevailingly of isotactic macromolecules. These higher alpha-olefins are obtained by low pressure polymerization with the aid of stereospecific catalysts. Still more specifically, this invention is directed to the preparation of manufactured articles which are highly receptive to acid, metallized and dispersed dyestuffs.

It has been found that manufactured articles such as textile fibers can be prepared which are highly receptive to dyestuffs. These articles are prepared by extruding a composition comprising polymers of higher alpha-olefins and a particular basic polyamide.

Applicant has previously disclosed that the dye receptivity of manufactured articles can be improved by mixing polymers of higher alpha-olefins with various condensation resins characterized by the presence of an —NHCO— group. These condensation resins are preferably mixed with the polymers of higher alpha-olefins, such as polypropylene, consisting prevailingly of isotactic macromolecules. Preferably, these resins have a low degree of condensation. They may be prepared by the polycondensation of higher amino acids, by condensation of diamines with dicarboxylic acids, by condensation of cyclic amides such as ε-caprolactam, e.g. polyamides, by reaction of an isocyanate with a higher glycol e.g. polyurethanes, or by the reaction of a diisocyanate with a diamine e.g. polyureas. Applicant has further disclosed the tinctorial modifications of polypropylene by the addition thereto of a basic polyamide. The polyamide can be obtained by polycondensation with isocinchomeronic acid.

It is, therefore, an object of this invention to prepare shaped articles such as fibers from compositions comprising poly-alpha-olefins and a tinctorial modifier. The addition of the tinctorial modifier to the poly-alpha-olefin increases the compositions' affinity to dyestuffs.

It is another object of this invention to provide a method of improving the affinity of dyes to poly-alpha-olefins by adding thereto a basic polyamide.

These and other objects of the invention will become apparent from a further and more detailed description of the invention.

It has been discovered, quite unexpectedly, that textile fibers which are particularly receptive to acid, metallized and dispersed dyes can be obtained by extruding a composition comprising from about 75–99% by weight of a poly-alpha-olefin and 1–25% by weight of at least one basic polyamide. The poly-alpha-olefins are obtained by using a stereospecific catalyst. The basic polyamides are prepared by the reaction of a diester containing a piperazine ring with an aliphatic, aromatic or heterocyclic diamine. The diester containing the piperazine ring can be characterized by the formula (I) 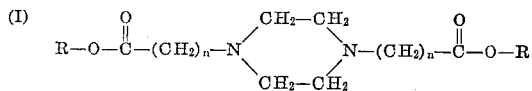

wherein R is an alkyl group containing 1–20 carbon atoms and $n$ is a number between 1 and 10. With the addition of 1–25% by weight of a basic polyamide as described above to the polyolefin consisting prevailingly of isotactic macromolecules, it is possible to obtain a dyeable polymeric composition.

The polyolefins included in this invention are polymers of olefins having the formula R—CH=CH$_2$ wherein R is an alkyl group, an aryl group or a hydrogen atom and include compounds such as polyethylene, polybutene-1, poly-4-methylpentene-1, polystyrene, polypropylene, etc. Of the polyolefins, polypropylene consisting prevailingly of isotactic macromolecules obtained by stereospecific polymerization of propylene is preferred.

Likewise, the preferred basic polyamides of this invention are those products obtained by the reaction of N,N'-bis(ω-carboalkoxyalkyl) piperazine with piperazine or hexamethylene-diamine with or without the presence of a solvent and/or condensing agents. Illustrative polyamides include those obtained by the reaction of N,N'-bis(2-carbomethoxyethyl)piperazine with piperazine or hexamethylene-diamine or the reaction of N,N'-bis(3-carbo methoxypropyl)piperazine with hexamethylene-diamine. The N,N'-bis(ω-carboalkoxyalkyl)piperazine used as the starting material can be obtained by reacting anhydrous piperazine with an ester of an alpha-beta unsaturated acid or with the ester of saturated ω-halomonocarboxylic acid.

The basic polyamides may be added to the poly-alpha-olefins by simply mixing the polyamides with the polyolefins with agitation. Other methods, however, may be used in mixing the polyamides with the olefins and include, for example, the addition of a polyolefin to a solution of the basic polyamide followed by evaporation of the solvent. In addition, it is possible to add the basic polyamide to the polyolefin at the end of the polymerization. The mixtures prepared according to any of the above methods are subsequently granulated and then extruded in a melt-spinning device preferably of the type described in Italian Patent No. 614,043. More preferably, the composition may be extruded in a spinning device having spinnerets of the type described in Italian Patent No. 600,248 having holes with a length/diameter ratio higher than 1.

The granulation and spinning are carried out by operating in the absence of oxygen and more preferably under an inert atmosphere such as nitrogen. The spinning of the composition is preferably carried out in the presence of a small but effective amount of a solid dispersing agent such as cetyl alcohol, stearyl alcohol, stearic acid, condensates of ethylene oxide with phenols and amines, etc., which facilitates the homogeneous dispersion of the basic polyamide in the molten polymeric mass. During the mixing, in addition to the polyamides other components including opacifiers and organic or inorganic pigments may be added to the polyolefins.

The fibers obtained after spinning are then subjected to a stretching process at stretching ratios between 1:2 and 1:10 at temperatures of 80–150° C. The stretching devices are heated with hot air, steam or a similar fluid or are provided with a heating plate. The fibers may be subjected to a dimensional stabilization treatment under free or prevented shrinking conditions at a temperature of 80°–160° C. as more particularly pointed out in Italian Patents 566,914 and 588,318. The fibers obtained by extruding the compositions in accordance with this invention may be mono- or pluri-filaments and thus can be used for preparing continuous or staple yarns, or for the preparation of bulky yarns or staple. These mono- or pluri-filaments can be subjected further to treatments with various compounds capable, if necessary, of rendering the basic polyamide present in the composition completely water-insoluble. Compounds which are particularly suitable for this purpose include the mono- and diepoxy compounds, the mono- and diisocyanates, the mono- and dialdehydes, the halogens, divinylbenzene and the like. Treatment with these compounds may be carried out before or after stretching.

The compositions of this invention may be used not only for the preparation of yarns but also for the preparation of other articles such as films, tapes, etc. The fibers were found to have a remarkable high receptivity for acid, pre-metallized and dispersed dyestuffs and also to have a better fastness, more particularly to light. The dyeing of the fibers was carried out, for example, for one and a half hours at the boiling point with the dyebath containing about 2.5% by weight of the dyestuffs based on the weight of the fiber. The fiber to bath weight ratio was about 1:40. In the case of dyeing with the acid and pre-metallized dyestuffs, the dyeing was carried out in the presence of about 3% by weight of the fiber of ammonium acetate and 1% by weight of a surface-active agent. The surfactant used in this particular instance was the condensation product of ethylene oxide and an alkylphenol. About 30 minutes after the bath started to boil, about 2% by weight of the fiber of a 20% acetic acid solution was added to the dyebath in order to improve the dyebath exhaustion. The dyeing with disperse dyes was carried out in the presence of about 2% by weight of the fiber of a surface-active agent.

The yarns obtained after the dyeing were then rinsed with running water and appeared to be intensely dyed in each case with every one of the above-mentioned dyestuffs. The fastness to light, washing and to rubbing of the colors were found to be very satisfactory.

The following examples illustrate the product and process according to this invention.

*Example 1*

About 142 g. (1.22 mols) of hexamethylene diamine and 258 g. (1 mol) of N,N'-bis(2-carbomethoxyethyl) piperazine were heated to 100° C. under nitrogen while agitating. The temperature was slowly raised to 200° C. within 3 hours. The mixture was kept for ½ hour at 200–210° C. In this last stage, the reaction mass became almost solid and could not be agitated. About 200 cc. of cyclohexanol were added and the mixture was heated until the reaction product was completely dissolved. The solution obtained was poured into 1000 cc. of petroleum ether. After complete cooling, the precipitate obtained was separated by filtration, washed with petroleum ether and dried under vacuum (1 mm. Hg) at about 100° C.

The product obtained was a very fine powder of light color which had a melting point of 170–177° C., total nitrogen (Kjeldal) of 17.8%, titrable nitrogen of 10.4%, specific viscosity in 1% ethanol solution at 25° C. of 0.16. About 260 g. of the basic polyamide was mixed with 3,740 g. of polypropylene having an intrinsic viscosity $[\eta]$ of 1.48, a residue after heptane extraction of 96.6% and an ash content of 0.012%.

The fibers obtained by extrusion were stretched and then treated with ethylene glycol diglycidyl ether as described in Italian Patent 628,251. On these fibers, intense solid colors were obtained with the following dyestuffs:

| | Color Index |
|---|---|
| Wool Red B | Acid Red 115 |
| Alizarine Blue SE | Acid Blue 43 |
| Lanasyn Red 2GL | Acid Red 216 |
| Lanasyn Brown 3RL | Acid Brown 30 |

*Example 2*

About 127.6 g. (1.1 mols) of hexamethylene diamine and 258 g. (1 mol) of N,N'-bis(2-carbomethoxyethyl) piperazine were heated under nitrogen while agitating, at 140°–160° C. for 1 hour and then at 240°–250° C. for 30 minutes. The molten mass was poured into 1000 cc. of n-butatnol and 5 liters of heptane were added to the solution obtained while vigorously agitating. The precipitate was separated by filtration, washed with heptane and then dried under vacuum (1–2 mm. Hg) at 100°–110° C. The product obtained was a very fine powder of light color having a melting point of 207°–215° C., a titrable nitrogen content of 9.8% and a specific viscosity (determined in a 1%-ethanol solution at 25° C.) of 0.22. About 280 grams of the basic polyamide were mixed with 3,720 g. of polypropylene which had an intrinsic viscosity $[\eta]$ of 1.48, a residue after heptane extraction of 96.6% and an ash content of 0.012%. The fibers obtained by extrusion were stretched and then treated with ethylene glycol diglycidyl ether as described in Italian Patent 628,251.

On these fibers, intense solid colors were obtained with the following dyestuffs:

| | Color Index |
|---|---|
| Wool Red B | Acid Red 115 |
| Alizarine Blue SE | Acid Blue 43 |
| Lanasyn Red 2GL | Acid Red 216 |
| Lanasyn Brown 3RL | Acid Brown 30 |

*Example 3*

About 103.2 g. (1.2 mols) of anhydrous piperazine and 258 g. (1 mol) of N,N'-bis(2-carbomethoxyethyl) piperazine were heated under nitrogen at 140–150° C. for 2 hours while agitating. The heating was continued for 2 hours at 180–200° C. and then for 3 hours at 210–230° C. The molten mass was poured into 500 cc. of n-butanol and to this solution 5 liters of heptane were added while vigorously agitating. The precipitate was separated by filtration, washed with heptane and then dried under a vacuum (1 mm. Hg) at 100° C. The basic polyamide, after drying, was a fine powder having a light color with a melting temperature of 183–200° C. and a titrable nitrogen content of 10.7%. The specific viscosity of a 1% ethanol solution at 25° C. was 0.14. About 260 g. of the basic polyamide was mixed with 3,740 g. of polypropylene having an intrinsic viscosity $[\eta]$ of 1.52, a residue after heptane extraction of 95.9% and an ash content of 0.013%. The fibers obtained by extrusion were stretched and then treated with ethylene glycol diglycidyl ether as described in Italian Patent 628,251. On these fibers, intense solid colors were obtained with the following dyestuffs:

| | Color Index |
|---|---|
| Wool Red B | Acid Red 115 |
| Alizarine Blue SE | Acid Blue 43 |
| Lanasyn Red 2GL | Acid Red 216 |
| Lanasyn Brown 3RL | Acid Brown 30 |

*Example 4*

About 139.2 g. (1.2 mols) of hexamethylene diamine and 286 g. (1 mol) of N,N'-bis(3-carbomethoxypropyl) piperazine were heated under nitrogen at 230–250° C. for 1 hour while agitating and then kept under a vacuum (4–5 mm. Hg) at 250–280° C. for 30 minutes.

The product obtained was a resinous solid having a light yellow color, a melting point of 172–183° C., a titrable nitrogen content of 9.7% and a specific viscosity (determnied in 1% ethanol solution at 25° C.) of 0.14. About 280 g. of the product were ground and sieved and mixed with 3,720 g. of polypropylene which had an intrinsic viscosity $[\eta]$ of 1.52, a residue after heptane extraction of 95.9% and an ash content of 0.013%. The fibers obtained by extrusion were stretched and then treated with ethylene glycol diglycidyl ether as described in Italian Patent 628,251. On these fibers, intense solid colors were obtained with the following dyestuffs:

| | Color Index |
|---|---|
| Wool Red B | Acid Red 115 |
| Alizarine Blue SE | Acid Blue 43 |
| Lanasyn Red 2GL | Acid Red 216 |
| Lanasyn Brown 3RL | Acid Brown 30 |

Example 5

N,N'-bis(2-carbomethoxyethyl)piperazine was prepared as follows:

About 189.2 g. (2.2 mols) of freshly distilled methyl acrylate were introduced into a 3-necked 1-liter flask, cooled with water and ice, provided with an agitator, a thermometer an a charging funnel. Non-distilled methyl acrylate, containing a polymerization inhibitor can be used but the addition products obtained are less pure and slightly colored. A solution of 86 g. (1 mol) of anhydrous piperazine in 86 g. of methanol was added thereto within 2 hours and a half, with the temperature at 10–15° C.

At the end of the addition of the piperazine, the mixture was kept at room temperature for 24 hours and was heated at 65° C. for 4 hours. Methanol and any excess of methyl acrylate were removed by distillation under reduced pressure.

The solid residue was crystallized twice from heptane. About 183 g. of N,N'-bis(2-carbomethoxyethyl-piperazine were obtained which had an M.P. of 55–56° C., a nitrogen content of 10.82% (calc. N=10.85%) and a yield of 71%.

Example 6

The preparation of N,N'-bis(2-carbomethoxyethyl)-2-methylpiperazine was carried out as in the preceding example by adding, within 2 hours, 100 g. (1 mol) of 2-methylpiperazine dissolved in 100 g. of methanol to 189.2 g. (2.2 mols) of freshly distilled methyl acrylate with the temperature at 2–5° C. The mixture was kept at room temperature for 24 hours and then heated to 65° C. for 4 hours. After removing methanol and any excess of methyl acrylate, the residual liquid was distilled under vacuum. About 191 g. of a liquid straw-yellow product was obtained which had a B.P. of 146–150° C. (0.5 mm. Hg), a nitrogen content of 11.70% (calc. N=10.29%) and a yield of crude product of 70%.

Example 7

The preparation of N,N'-bis(2-carbomethoxyethyl)-trans-2,5-dimethylpiperazine is similar to Examples 5 and 6. The crystalline residue, obtained after removal of the volatile products, was crystallized three-times from heptane. About 257 g. (yield of 90%) of product were obtained which had an M.P. of 66–67° C. and a nitrogen content of 9.73% (calc. N=9.78%).

Example 8

The preparation of N,N'-bis(3-carbomethoxypropyl) piperazine was carried out as follows:

About 344 g. (4 mols) of anhydrous piperazine, 1120 g. (8.2 mols) of methyl-γ-chlorobutyrate, 466.4 g. (4.4 mols) of anhydrous sodium carbonate, 12 g. of potassium iodide and 2,000 cc. of methanol were refluxed for a week while agitating. The sodium chloride formed was separated by warm filtration. The filtration was concentrated by distilling off methanol under a reduced pressure and the residue was fractionated under a vacuum. The main fraction was redistilled. The product had a boiling point of 160–170° C. (1 mm. Hg) and was solidified by cooling. The crude product was recrystallized twice from heptane. About 137 g. (yield 12%) of N,N'-bis(3-carbomethoxypropyl)piperazine was obtained which had a melting point of 38–39° C., and a nitrogen content of 9.81% (calc. N=9.78%).

While this invention has been described with respect to a number of specific embodiments, it is obvious that there are many other modifications and variations which can be made without departing from the spirit of the invention, except as more particularly pointed out in the appended claims.

What is claimed is:

1. A dyeable polymeric composition having a high receptivity to acid, metallized and dispersed dyestuffs and a good light fastness which comprises 75–99% by weight of a polyolefin consisting prevailingly of isotactic macromolecules and 1–25% by weight of a basic polyamide; said polyamide being the reaction product of (1) a diester having the formula

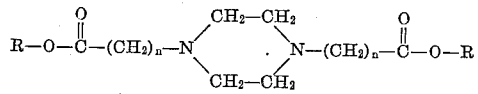

wherein R is an alkyl group containing 1 to 20 carbon atoms and n is a number ranging between 1 and 10 and (2) a diamine selected from the group consisting of aliphatic, aromatic and heterocyclic diamines.

2. The polymeric composition of claim 1 wherein the polyolefin is polypropylene consisting prevailingly of isotactic macromolecules.

3. Textile fibers, yarns, films, tapes and other shaped articles prepared from the polymeric composition of claim 1.

4. Textile fibers in the form of mono- and pluri-filaments, yarns, films, tapes and other shaped articles prepared from the polymeric composition of claim 2.

5. A process for preparing shaped articles including fibers, films, and tapes having a high receptivity to acid, metallized and dispersed dyestuffs and a good light fastness which comprises extruding said articles from a composition comprising 75–99% by weight of a polyolefin consisting prevailingly of isotactic macromolecules and 1–25% by weight of a basic polyamide; said polyamide being the reaction product of (1) a diester having the formula

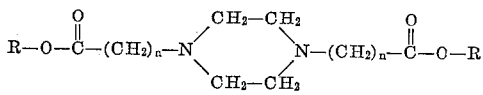

wherein R is an alkyl group containing 1 to 20 carbon atoms and n is a number ranging between 1 and 10 and (2) a diamine selected from the group consisting of an aliphatic, aromatic and heterocyclic diamines.

6. The process of claim 5 wherein the polyolefin is polypropylene consisting prevailingly of isotactic macromolecules.

7. The process of claim 5 wherein the basic polyamides are obtained by reacting the diester with the diamines in the presence of a solvent and an effective amount of a condensing agent.

8. The process of claim 5 wherein the diester is N,N'-bis(2-carbomethoxyethyl)piperazine.

9. The process of claim 5 wherein the diester is N,N'-bis(3-carbomethoxypropyl)piperazine.

10. The process of claim 5 wherein the diamine is piperazine.

11. The process of claim 5 wherein the diamine is hexamethylene diamine.

12. The process of claim 5 wherein the basic polyamide is the reaction product of N,N'-bis(2-carbomethoxyethyl) piperazine and piperazine.

13. The process of claim 5 wherein the basic polyamide is the reaction product of N,N'-bis(2-carbomethoxyethyl) piperazine and hexamethylene diamine.

14. The process of claim 5 wherein the basic polyamide is the reaction product of N,N'-bis(3-carbomethoxypropyl)piperazine and hexamethylene diamine.

15. The process of claim 5 wherein said films and fibers are subjected to a stretching process with stretching ratios between 1:2 and 1:10 at temperatures ranging from 80°–150° C.

16. The process of claim 15 wherein the stretched films and fibers are subjected to a dimenisonal-stabilization treatment at temperatures between 80°–160° C.

17. The process of claim 16 wherein the dimensional-stabilization treatment takes place under prevented shrinking conditions.

18. The process of claim 5 wherein the fibers and films are subjected to treatment with a compound which renders the basic polyamide water-insoluble; said compound being selected from the group consisting of mono- and diepoxy compounds, mono- and diisocyanates, mono- and dialdehydes, halogens, and divinylbenzene.

19. The process of claim 5 wherein the fibers and films are treated with an acid to improve the dyeability and the color fastness.

No references cited.

MURRAY TILLMAN, *Primary Examiner.*

PAUL LIEBERMAN, *Assistant Examiner.*